United States Patent [19]
Ikeda

[11] Patent Number: 5,737,808
[45] Date of Patent: Apr. 14, 1998

[54] CORD FASTENER

[75] Inventor: Yasuhiko Ikeda, Toyonaka, Japan

[73] Assignee: NIFCO Inc., Yokohama, Japan

[21] Appl. No.: 789,362

[22] Filed: Jan. 27, 1997

[30] Foreign Application Priority Data

Mar. 7, 1996 [JP] Japan ..................... 8-078145

[51] Int. Cl.$^6$ ..................................................... F16G 11/00
[52] U.S. Cl. .................... 24/115 G; 24/136 L; 24/136 R
[58] Field of Search .................. 24/115 G, 115 L, 24/136 R, 136 L, 580–583, 115 M, 115 F, 136 A; 439/460–473, 817, 819, 727

[56] References Cited

U.S. PATENT DOCUMENTS

| | | | |
|---|---|---|---|
| 4,288,891 | 9/1981 | Boden | 24/115 G |
| 4,453,292 | 6/1984 | Bakker | 24/115 G |
| 4,839,946 | 6/1989 | Murai | 24/115 G |
| 5,197,166 | 3/1993 | Meier et al. | 24/115 G |
| 5,323,514 | 6/1994 | Masuda et al. | 24/115 G |
| 5,345,657 | 9/1994 | Shimizu | 24/115 G |
| 5,361,461 | 11/1994 | Anscher | 24/115 G |
| 5,451,082 | 9/1995 | Murai | 24/115 G X |
| 5,621,952 | 4/1997 | Frano | 24/115 G |

FOREIGN PATENT DOCUMENTS

| | | | |
|---|---|---|---|
| 229883 | 7/1987 | European Pat. Off. | 24/115 G |
| 3535623 | 4/1987 | Germany | 24/115 G |
| 2 290 105 | 12/1995 | United Kingdom . | |

Primary Examiner—Peter M. Cuomo
Assistant Examiner—Robert J. Sandy
Attorney, Agent, or Firm—Schwartz & Weinrieb

[57] ABSTRACT

A cord fastener includes an insert having a lateral inner cord hole and provided at a lower portion thereof with elastic provisional retaining claws extending outwardly and catches for securing the provisional retaining claws; a shell having an insertion hole for insertion of the insert, outer cord holes communicating with the insertion hole and alignable with the inner cord hole, provisional retainers provided on the inner surface of the insertion hole below the outer cord holes for engaging the tips of the provisional retaining claws in a first state when the inner and outer cord holes are approximately aligned, and pushers provided on the inner surface of the insertion hole below the provisional retainers for pressing the provisional retaining claws inwardly in a second state when the insert is pressed further into the insertion hole than in the first state, thereby causing the provisional retaining claws to engage the catches so as to prevent them from engaging the provisional retainers; and a coil spring provided in the insertion hole for biasing the insert in the direction of projecting it outwardly from the insertion hole.

20 Claims, 8 Drawing Sheets

CORD FASTENER

BACKGROUND OF THE INVENTION

1. Field of the Invention

This invention relates to a cord fastener used for adjusting the fastening state or fastening position of a cord of, for example, a tent, knapsack or parka.

2. Description of the Prior Art

A cord fastener of this type consists of an insert having a lateral inner cord hole, a shell having an insertion hole for insertion of the insert and outer cord holes facing the inner cord hole and communicating with the insertion hole, and a coil spring serving as an energizing member for biasing the insert in the direction of projecting it outwardly from the shell, whereby a cord passed through the outer cord holes and the inner cord hole is clamped between the insert and the shell due to the biasing force of the coil spring, thereby enabling the cord to be maintained in a fastened state and the fastening position thereof to be adjusted.

The clamping force of the insert and the shell on the cord is increased by increasing the force of the coil spring.

To pass a cord through the outer and inner cord holes of this conventional cord fastener, the insert has to be pressed into the shell against the force of the coil spring and maintained in the depressed state so as to maintain the holes in approximate alignment. Since the worker who inserts the cord therefore has to continue pressing the insert by his fingers during cord insertion, the efficiency of the operation is poor. Over a prolonged period of such work, the worker is likely to tire and become unable to skillfully press the insert into the shell. This reduces the working efficiency, particularly in the case of a cord fastener with a strong spring.

Object of the Invention

This invention was developed so as to overcome the aforenoted disadvantages and has as its object to provide a cord fastener which does not require the insert to be pressed by an operator's finger and enables the cord insertion operation to be conducted efficiently even over long work periods.

SUMMARY OF THE INVENTION

To achieve this object, this invention provides a cord fastener comprising:

an insert having a lateral inner cord hole and provided at a lower portion thereof with at least one elastic provisional retaining claw opening outwardly and at least one catch for engaging the provisional retaining claw, a shell having an insertion hole for insertion of the insert, outer cord holes communicating with the insertion hole and alignable with the inner cord hole, at least one provisional retainer provided on an inner surface of the insertion hole below the outer cord holes for engaging a tip of the provisional retaining claw in a first state when the inner and outer cord holes are approximately aligned, and at least one pusher provided on the inner surface of the insertion hole below the provisional retainer for pressing the provisional retaining claw inwardly to a second state when the insert is pressed further into the insertion hole than in the first state, thereby causing the provisional retaining claw to engage the catch so as to prevent it from engaging the provisional retainer, and an energizing member provided in the insertion hole for biasing the insert in a direction for projecting it outwardly from the insertion hole.

In a modified configuration of the cord fastener according to this invention, the insert is provided at a lower portion thereof with a plastically deformable provisional retaining claw of prescribed elasticity which opens upwardly and the shell has at least one provisional retainer provided on the inner surface of the insertion hole below the outer cord holes for engaging the tip of the provisional retaining claw in a first state when the inner and outer cord holes are approximately aligned and at least one pusher provided on the inner surface of the insertion hole below the provisional retainer for pressing and plastically deforming the provisional retaining claw inwardly to a second state when the insert is pressed further into the insertion hole than in the first state, thereby preventing the provisional retaining claw from engaging the provisional retainer.

Since the lower portion of the insert is provided with the provisional retaining claw and the inner surface of the shell is formed with the provisional retainer, these two members engage each other so as to retain the inner cord hole of the insert and the outer cord holes of the shell in approximate alignment. The work of inserting a cord can therefore be conducted easily without need to keep the insert pressed into the shell by an operator's finger.

Once the insertion of the cord is completed, the insert is pressed still further into the shell. This releases the provisional retaining claw from the provisional retainer and engages it with the catch so that the provisional retaining claw can clear the provisional retainer. As a result, the cord fastener of the present invention can be used in the same manner as a conventional cord fastener.

BRIEF DESCRIPTION OF THE DRAWINGS

The above and other objects, characteristic features and advantages of this invention will become apparent to those skilled in the art from the description of the invention given hereinbelow with reference to the accompanying drawings in which like reference characters designate like or corresponding parts throughout the several views, and wherein.

DETAILED DESCRIPTION OF THE ILLUSTRATED EMBODIMENTS

FIGS. 1 to 4 show a cord fastener that is a first embodiment of the invention. The cord fastener comprises an insert 1 formed of synthetic resin and has a head portion 2 which is of elliptical shape in plan view and functions as a stopper, a shaft portion 3, elliptical in plan view but smaller than the head portion 2, which extends downwardly from the head portion 2, a cylindrical portion 4 which extends downwardly from the shaft portion 3 in the profile thereof but has a shorter lateral length than the shaft portion 3, elastic provisional retaining claws 5, 5 rising from opposite lateral sides of the bottom end of the cylindrical portion 4 and opening outwardly, and catches 6, 6 extending outwardly from opposite lateral sides of the top end of the cylindrical portion 4 so as not to engage provisional retainers 15, 15 of a shell 11 (explained later) but to secure the provisional retaining claws 5, 5 so as not to engage the provisional retainers 15, 15 when such is desired.

The shaft portion 3 has a laterally extending inner cord hole 3h, grooves 3d, 3d formed above the inner cord hole 3h for receiving retaining projections 14, 14 of the shell 11 (explained later), and an annular groove 3g formed in its bottom surface located inside the cylindrical portion 4 for receiving and fixing the position of a coil spring 25 (explained later).

The shell 11, shown in FIG. 2, is formed of synthetic resin and has the same elliptical shape in plan view as that of the head portion 2. It has an axially extendible elliptical insertion hole 12 for insertion of the shaft portion 3 and is provided at opposite lateral sides thereof with outwardly flared outer cord holes 13, 13 alignable with the inner cord hole 3h of the shaft portion 3.

Figure 1A:
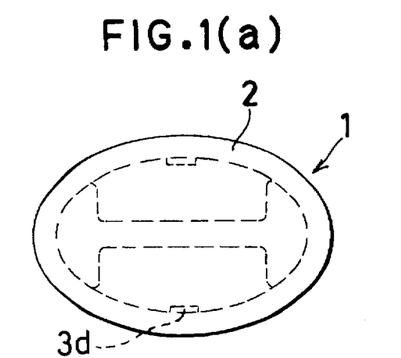
FIG. 1(a) is a plan view of an insert used in a cord fastener that is a first embodiment of the invention.
Figure 1B:
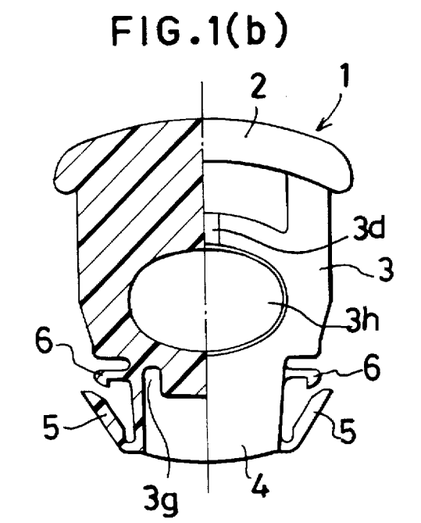
FIG. 1(b) is a front view of the insert of FIG. 1(a) showing the left half thereof in section.
Figure 1C:
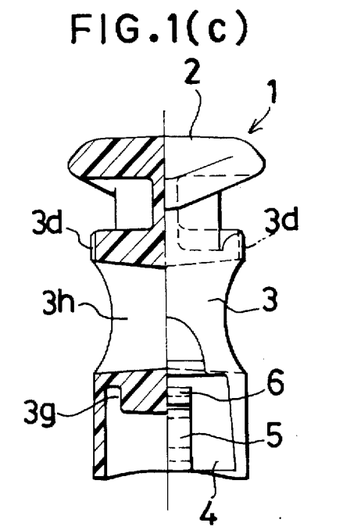
FIG. 1(c) is a side view of the insert of FIG. 1(a) showing the half thereof in section.
Figure 1D:
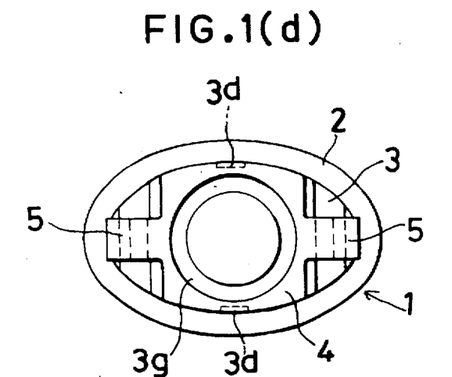
FIG. 1(d) is a bottom view of the insert of FIG. 1(a).
Figure 2A:
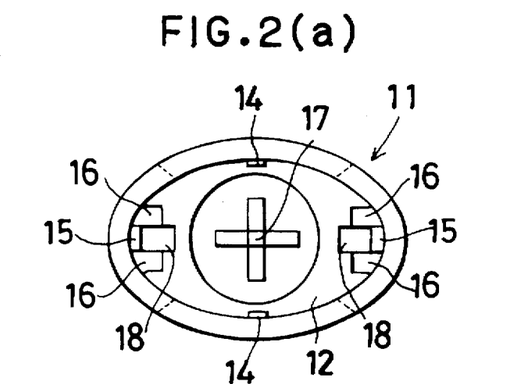
FIG. 2(a) is a plan view of a shell used in the first embodiment of the inventive cord fastener.
Figure 2B:
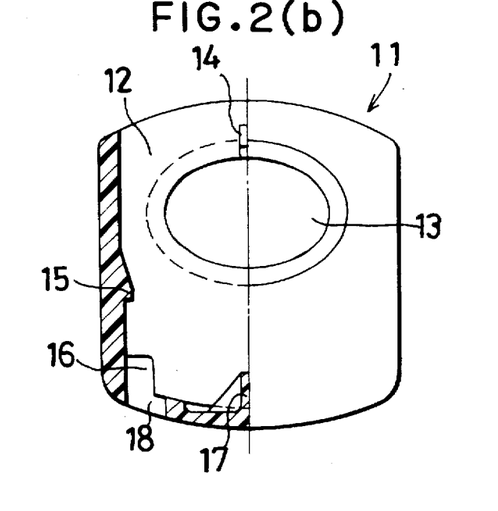
FIG. 2(b) is a front view of the shell of FIG. 2(a) showing the left half thereof in section.
Figure 2C:
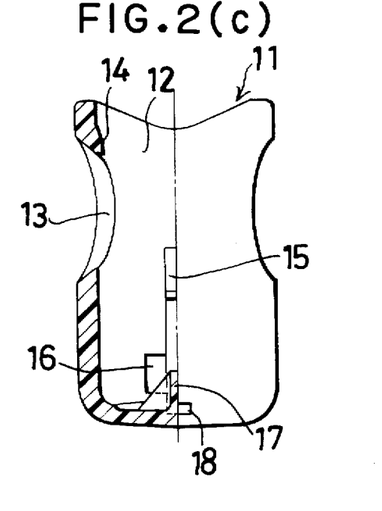
FIG. 2(c) is a side view of the shell of FIG. 2(a) showing the left half thereof in section.

The upper end of the inner surface of the insertion hole 12 is formed at locations opposite the grooves 3d, 3d with the retaining projections 14, 14 for engaging with the grooves 3d, 3d so as to prevent the insert 1 from falling out of the insertion hole 12.

The inner surface of the insertion hole 12 below the outer cord holes 13, 13 is formed at locations opposite the provisional retaining claws 5, 5 with the provisional retainers 15, 15 for engagement with the tips of the provisional retaining claws 5, 5.

The inner surface of the insertion hole 12 below the provisional retainers 15, 15 is also formed at locations opposite the provisional retaining claws 5, 5 with pushers 16, 16 for pressing the provisional retaining claws 5, 5 inwardly so as not to engage the provisional retainers 15, 15 when such is desired.

Figure 2D:
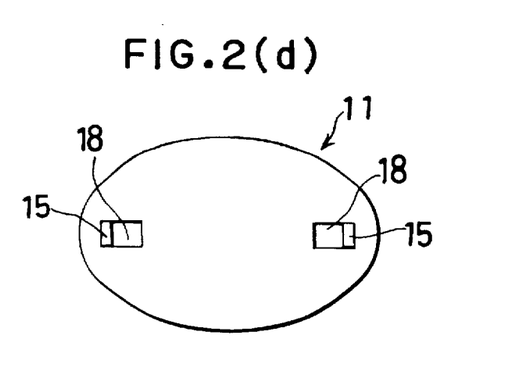
FIG. 2(d) is a bottom view of the shell of FIG. 2(a).

The floor of the shell 11 is formed at the center thereof with a locator protuberance 17 for positioning the other end of the coil spring 21 and at locations near the pushers 16, 16 with die extraction holes 18, 18, which are holes remaining after extraction of the die portions for forming the provisional retainers 15, 15.

FIG. 3 shows the cord fastener according to the first embodiment of the invention as assembled into the provisionally retained state. FIG. 3(a) is a plan view, FIG. 3(b) is a front view with the left half shown in section, FIG. 3(c) is a right side view with the left half shown in section, and FIG. 3(d) is a bottom view.

Figure 3A:
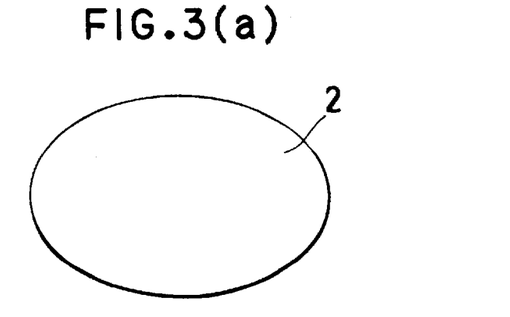
FIG. 3(a) is a plan view of the first embodiment of the cord fastener in the provisionally retained state.
Figure 3B:
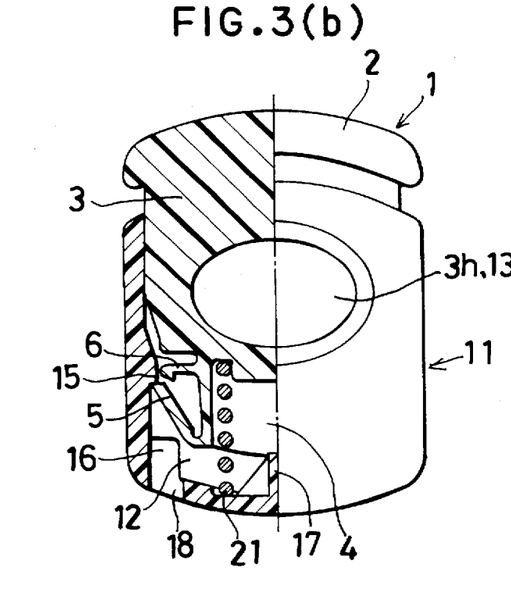
FIG. 3(b) is a front view of the cord fastener of FIG. 3(a) in the provisionally retained state, showing the left half thereof in section.
Figure 3C:
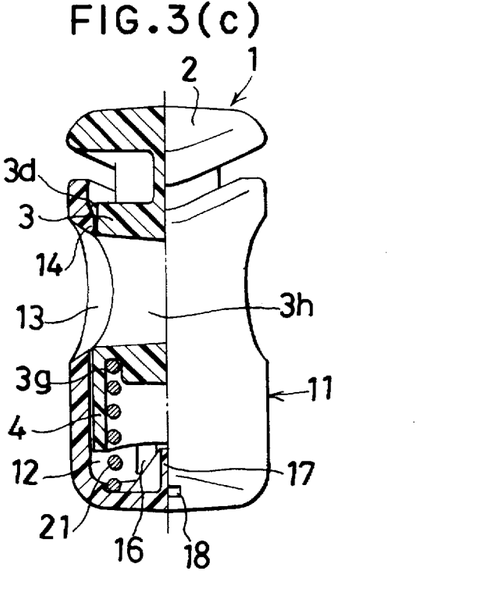
FIG. 3(c) is a side view of the cord fastener of FIG. 3(a) in the provisionally retained state, showing the left half thereof in section.
Figure 3D:
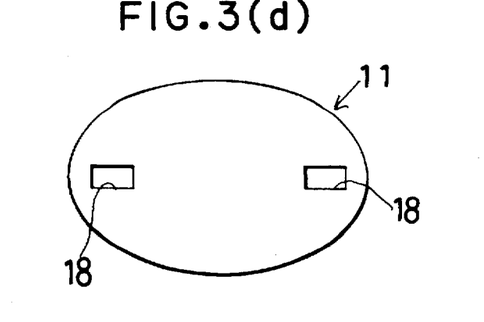
FIG. 3(d) is a bottom view of the cord fastener of FIG. 3(a) in the provisionally retained state.

The front view of FIG. 3(b) and the right side view of FIG. 3(c) are laterally symmetrical, the rear view (not shown) is the same as the front view, and the left side view (not shown) is the same as the right side view.

As shown in FIG. 3, coil spring 21 is inserted in the insertion hole 12 between the insert 1 and the floor of the shell 11 as an energizing member which biases the insert 1 in the direction of projecting it outwardly from the insertion hole 12.

FIGS. 4(a), 4(b), 4(c) and 4(d) show the operation of the first embodiment of the cord fastener. The symbol S in these figures designates a cord.

The assembly of this cord fastener, the passing of a cord therethrough and the clamping of the cord thereby will now be explained.

Figure 4A:
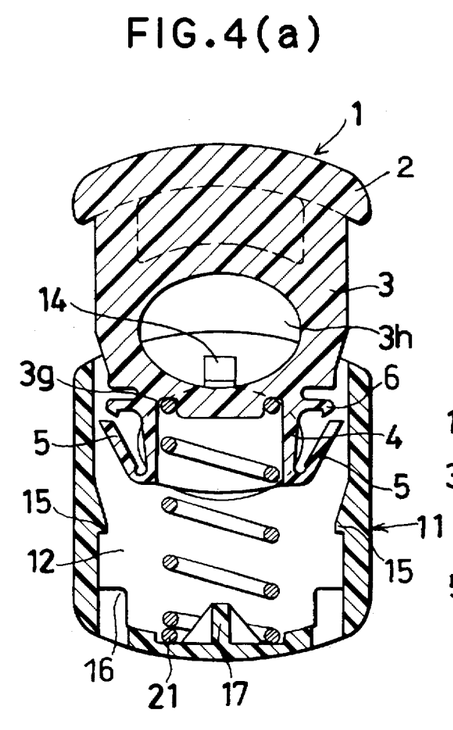
FIG. 4(a) is a sectional view of the first embodiment of the cord fastener showing the insert partially inserted into the shell.

As shown in FIG. 4(a), in the initial state of the insert 1, the tips of the provisional retaining claws 5, 5 are not engaged with the catches 6, 6 but open or extend outwardly by their own elasticity.

The coil spring 21 is inserted into the shell 11 so that its lower end is located around the locator protuberance 17. The insert 1 is then positioned over the insertion hole 12 of the shell 11 with its cylindrical portion 4 facing downwardly, whereafter the cylindrical portion 4 and the shaft portion 3 are pushed into the insertion hole 12 so that the upper end of the coil spring 21 is inserted into the cylindrical portion 4. As they move inwardly, the cylindrical portion 4 and the shaft portion 3 apply outward pressure on the retaining projections 14, 14. This pressure elastically deforms the shell 11 and enables the cylindrical portion 4 and the shaft portion 3 to enter the insertion hole 12.

The retaining projections 14, 14 pass along the exteriors of the cylindrical portion 4 and the shaft portion 3 and enter the inner cord hole 3h. This is the state shown in FIG. 4(a). In this state, the insert 1 cannot be extracted from the insertion hole 12 unless the shell 11 is elastically deformed by application of pressure in opposite lateral directions.

At this time, the upper end of the coil spring 21 is located in the groove 3g.

When the insert 1 in the state shown in FIG. 4(a) is pressed further into the insertion hole 12 against the force of the coil spring 21, the provisional retaining claws 5, 5 first flex inwardly under pressure from the provisional retainers 15, 15 and then, when they have passed the provisional retainers 15, 15 and the inner and outer cord holes 3h, 13, 13 are approximately aligned (this being called the "first state"), they open outwardly due to their elasticity so that their tips move under the provisional retainers 15, 15.

Figure 4B:
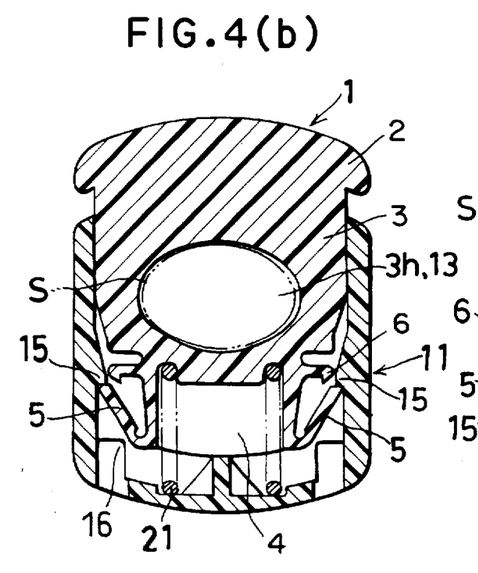
FIG. 4(b) is a sectional view of the cord fastener of FIG. 4(a) showing the insert provisionally retained by the shell.

In this state, if the inward pressure on the insert 1 is released, the provisional retaining claws 5, 5 engage the provisional retainers 15, 15 so as to establish a provisionally retained state in which the inner and outer cord holes 3h, 13, 13 maintained approximately aligned, as shown in FIG. 4(b). A cord S can therefore be passed through the inner and outer holes 3h, 13, 13.

The passage of the cord S through the inner and outer holes 3h, 13, 13 is easy to achieve because the outer cord holes 13, 13 are flared outwardly or tapered inwardly so that the surface of the outer cord hole 13 into which the cord S is inserted guides the cord S into the inner cord hole 3h.

Figure 4C:
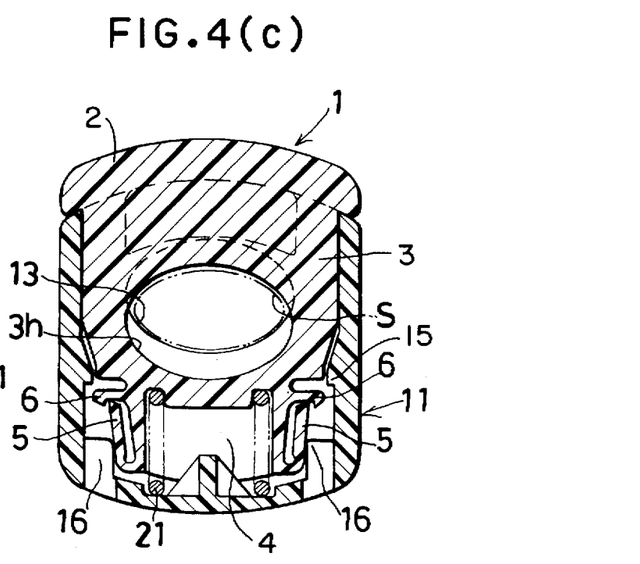
FIG. 4(c) is a sectional view of the cord fastener of FIG. 4(a) showing the insert pushed further into the shell.

When the insert 1 in the state shown in FIG. 4(b) is pressed further into the insertion hole 12 against the force of the coil spring 21 until the head portion 2 strikes the shell 11 as shown in FIG. 4(c) (this being called the "second state"), the provisional retaining claws 5, 5 are flexed inwardly by pressure from the pushers 16, 16 so that the tips of the provisional retaining claws 5, 5 engage the catches 6, 6. In this state, the provisional retaining claws 5, 5 are prevented from again engaging the provisional retainers 15, 15.

Figure 4D:
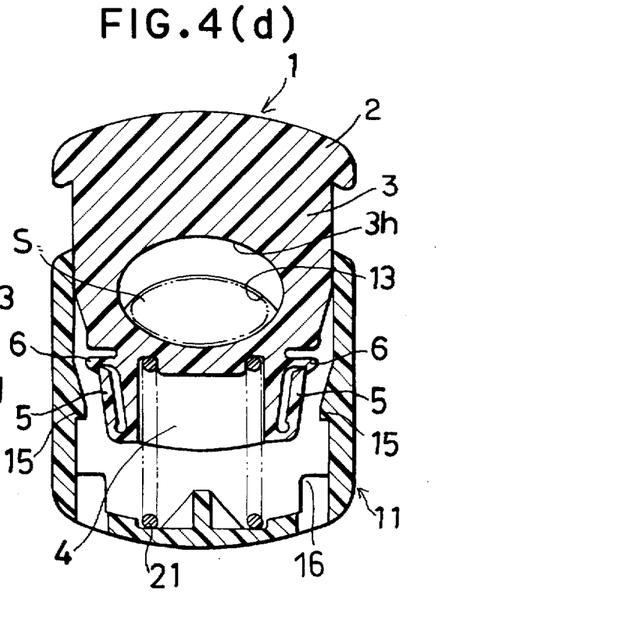
FIG. 4(d) is a sectional view of the cord fastener of FIG. 4(a) showing a cord clamped by the insert and the shell.

In this state, if the inward pressure on the insert 1 is released, the insert 1 is pushed upwardly by the biasing force of the coil spring 21. As a result, the cord S is clamped by the insert 1 and the shell 11 as shown in FIG. 4(d).

Since the portions of the shell 11 at the upper side of the outer cord holes 13, 13 are formed as sharp edges, the biasing force of the coil spring 21 on the insert 1 concentrates its forces at these edge portions of the shell 11 when the cord S is clamped between the insert 1 and the shell 11.

When the cord S is clamped by the insert 1 and the shell 11, the cylindrical portion 4 hides the interior of the shell 11 from view through the outer cord holes 13, 13.

As is clear from the foregoing, the cord fastener according to the first embodiment of the invention consists of only three components, the insert 1, the shell 11 and the coil spring 21. Due to the small number of components, it can be manufactured at low cost.

Moreover, the assembly of the cord fastener is simple, only requiring insertion of the insert 1 into the shell 11 after insertion of the coil spring 21 into the shell 11.

Since the retaining projections 14, 14 engage the insert 1 when the insert 1 is inserted into the shell 11, the insert 1 and the shell 11 are safe from separation even when no cord S has been passed through the cord fastener.

In the first state, when the provisional retaining claws 5, 5 are engaged with the provisional retainers 15, 15, the inner and outer cord holes 3h, 13, 13 are in approximate alignment so that the insert 1 need not be pressed inwardly against the force of the coil spring 21 while the cord S is being passed through these holes 3h, 13, 13. The work of inserting cords into cord fasteners can therefore be conducted with good efficiency even over long work periods.

The passage of the cord S through the inner and outer holes 3h, 13, 13 is easy to perform because the outer cord holes 13, 13 are flared outwardly so that the surface of the outer cord hole 13 into which the cord S is inserted guides the cord S into the inner cord hole 3h.

Since the cylindrical portion 4 of the insert 1 hides the interior of the shell 11 from view through the outer cord holes 13, 13, foreign matter is prevented from entering the shell 11 through the outer cord holes 13, 13 during use. This reduces the possibility of operational problems.

Figure 5:
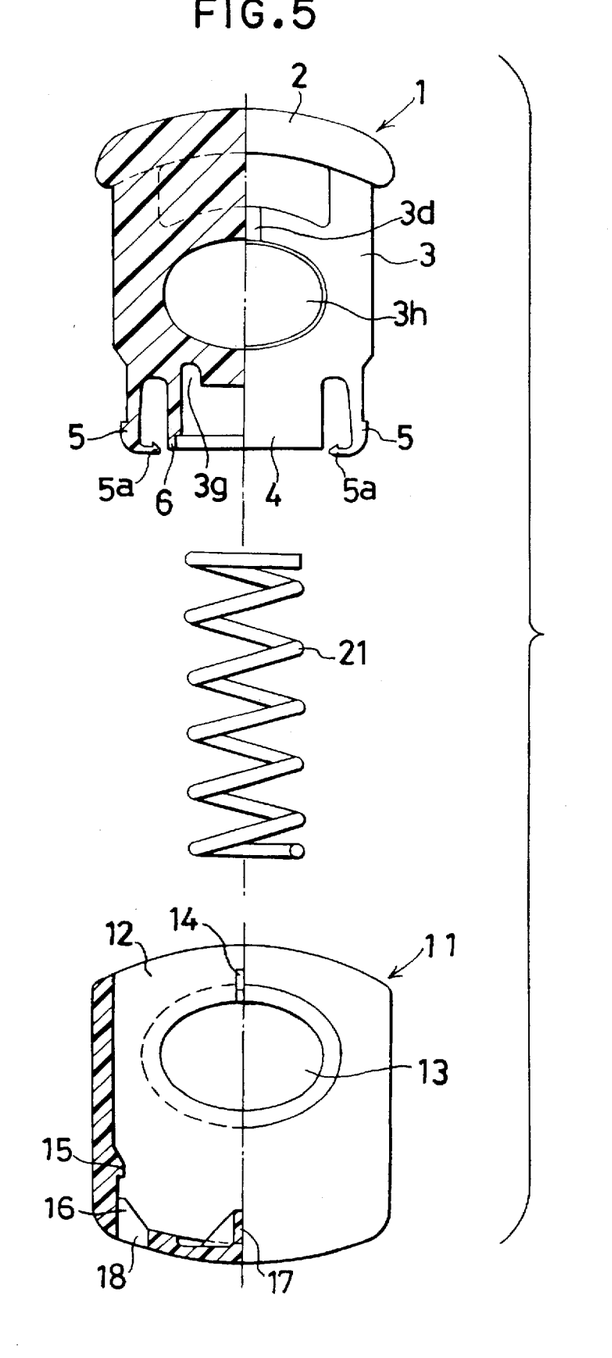
FIG. 5 is an exploded view, partially in section, of a cord fastener that is a second embodiment of the invention.
Figure 6A:
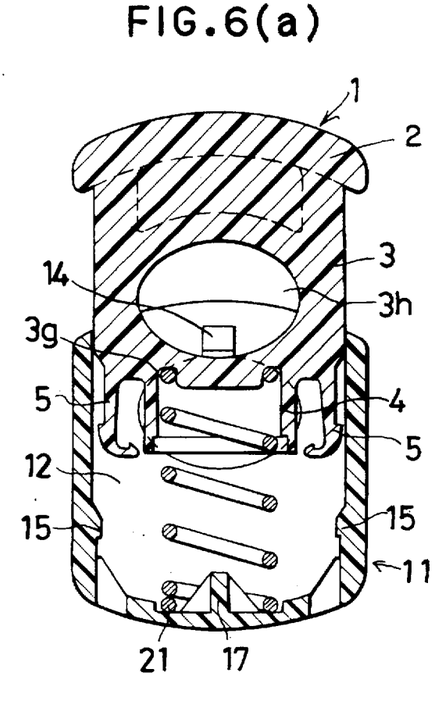
FIG. 6(a) is a sectional view of the cord fastener of FIG. 5 showing the insert partially inserted into the shell.
Figure 6B:
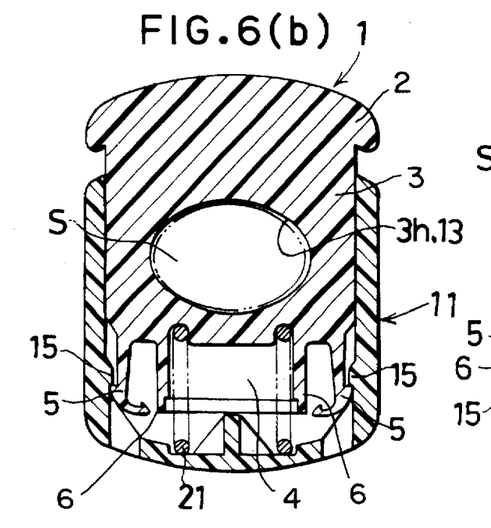
FIG. 6(b) is a sectional view of the cord fastener of FIG. 5 showing the insert provisionally retained by the shell.
Figure 6C:
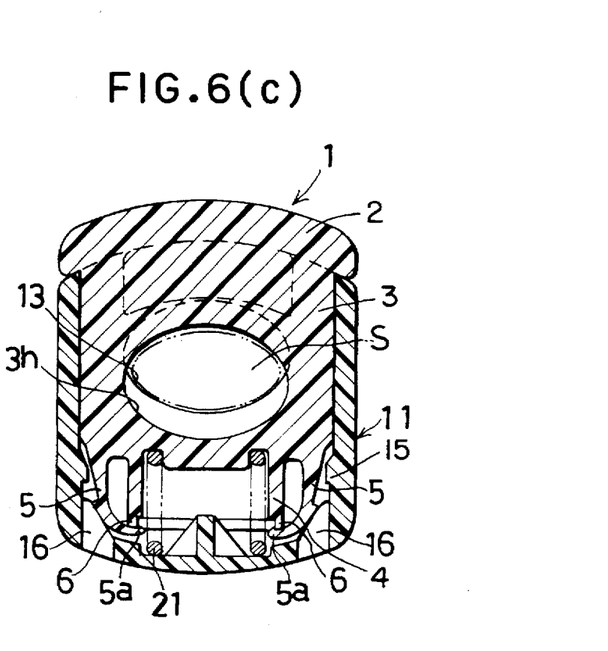
FIG. 6(c) ms a sectional view of the cord fastener of FIG. 5 showing the insert pushed further into the shell.
Figure 6D:
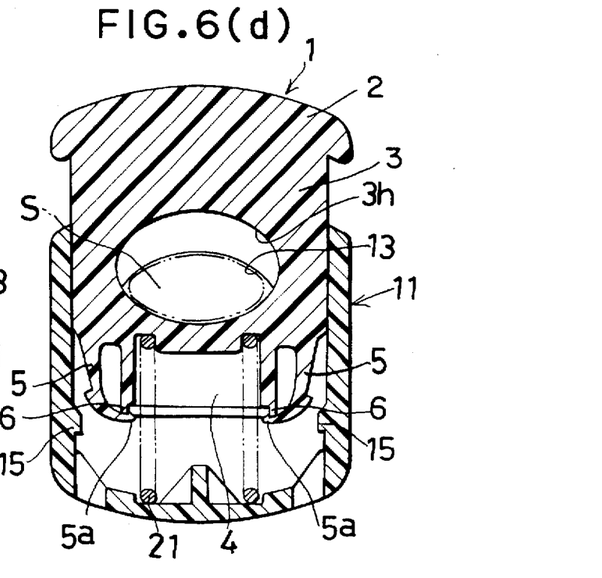
FIG. 6(d) is a sectional view of the cord fastener of FIG. 5 showing a cord clamped by the insert and the shell.

FIG. 5 is an exploded view of a cord fastener that is a second embodiment of the invention, and FIGS. 6(a), 6(b), 6(c) and 6(d) show the operation thereof.

Portions which are the same as or similar to those of the first embodiment of FIGS. 1 to 4 are assigned the same reference symbols as those of the first embodiment and will not be described further. FIG. 5 shows the left halves of the insert and the shell in section.

The points of difference between the insert 1 of the second embodiment and that of the first embodiment are that the provisional retaining claws 5, 5 are directed downwardly from the shaft portion 3, that the tips of the provisional retaining claws 5, 5 are bent toward the cylindrical portion 4 and are provided with hooked portions 5a, 5a for engagement with the catches 6, 6, and that the catches 6, 6 are constituted by the bottom end of the cylindrical portion 4.

The other portions of the insert 1 of the second embodiment are the same as the other portions of the insert 1 of the first embodiment.

The assembly of the cord fastener, the passing of a cord therethrough and the clamping of the cord thereby, shown in FIGS. 6(a) to 6(d), are substantially the same as those of the first embodiment and will not be described further. The second embodiment provides the same effects as the first.

Figure 7:
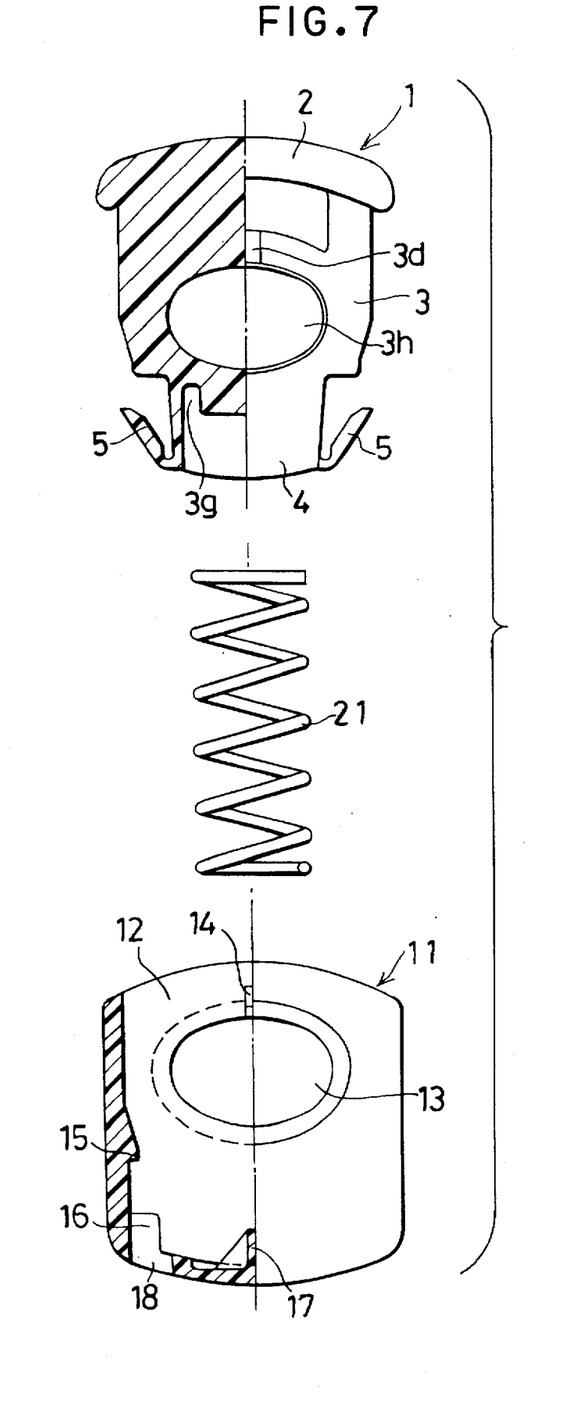
FIG. 7 is an exploded view, partially in section, of a cord fastener that is a third embodiment of the invention.

FIG. 7 is an exploded view of a cord fastener that is a third embodiment of the invention, and FIGS. 8(a), 8(b), 8(c) and 8(d) show the operation thereof. Portions which are the same as or similar to those in FIGS. 1 to 6 are assigned the same reference symbols as those in these figures and will not be described further. FIG. 7 shows the left halves of the insert and the shell in section.

The points of difference between the insert 1 of the third embodiment and that of the first embodiment are that it is formed of a resin such as ABS resin enabling plastic deformation of the provisional retaining claws 5, 5 when they are subjected to more than a prescribed amount of stress and that the catches 6, 6 are omitted.

The other portions of the insert 1 of the third embodiment are the same as the other portions of the insert 1 of the first embodiment.

Figure 8A:
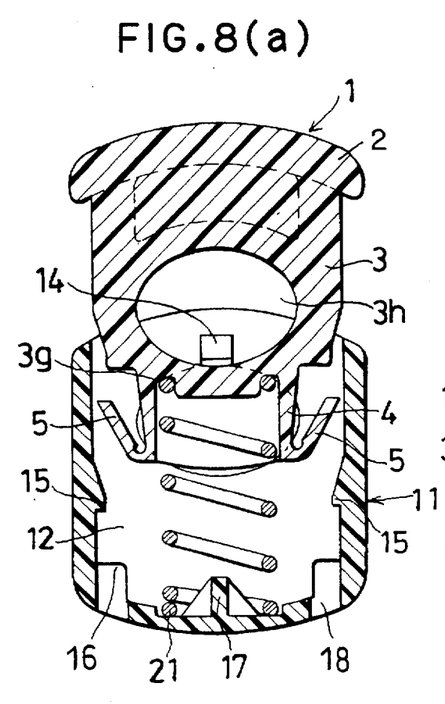
FIG. 8(a) is a sectional view of the cord fastener of FIG. 7 showing the insert partially inserted into the shell.

The assembly of this cord fastener, the passing of a cord therethrough and the clamping of the cord thereby will now be explained. In the initial state of the insert 1, the tips of the provisional retaining claws 5, 5 open or extend outwardly. After the coil spring 21 has been inserted into the shell 11, the shaft portion 3 of the insert 1 is inserted therein and pressed inwardly. The cylindrical portion 4 and the shaft portion 3 press the retaining projections 14, 14 outwardly as they move inwardly until the shaft portion 3 is partially inserted in the insertion hole 12 as shown in FIG. 8(a).

When the insert 1 is pressed further into the insertion hole 12 against the force of the coil spring 21, the tips of the provisional retaining claws 5, 5 are first flexed slightly inwardly by pressure from the provisional retainers 15, 15 and then, when they have passed the provisional retainers 15, 15 and the inner and outer cord holes 3h, 13, 13 are approximately aligned (the first state), the provisional retaining claws 5, 5 flex back to their original state and their tips move under the provisional retainers 15, 15. Although the provisional retaining claws 5, 5 are plastically deformable, they are nevertheless able to return to their original state because the amount of inward flexing is slight at this time and the elastic limit is not exceeded. When the inward pressure on the insert 1 is released, the tips of the provisional retaining claws 5, 5 engage the provisional retainers 15, 15 so as to establish the provisionally retained state shown in FIG. 8(b).

Figure 8B:
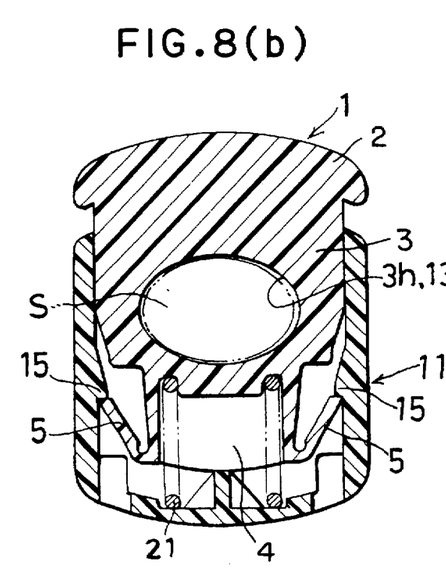
FIG. 8(b) is a sectional view of the cord fastener of FIG. 7 showing the insert provisionally retained by the shell.
Figure 8C:
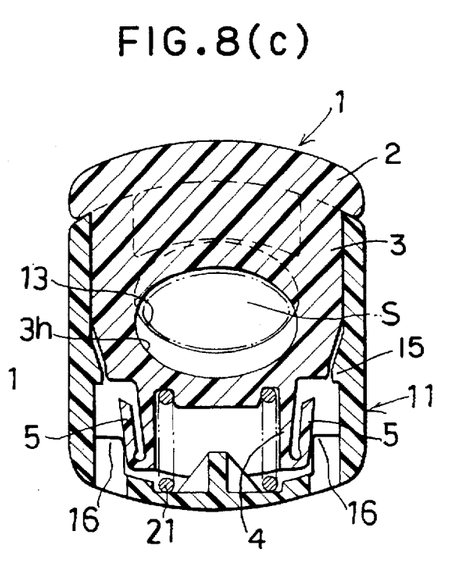
FIG. 8(c) is a sectional view of the cord fastener of FIG. 7 showing the insert pushed further into the shell.
Figure 8D:
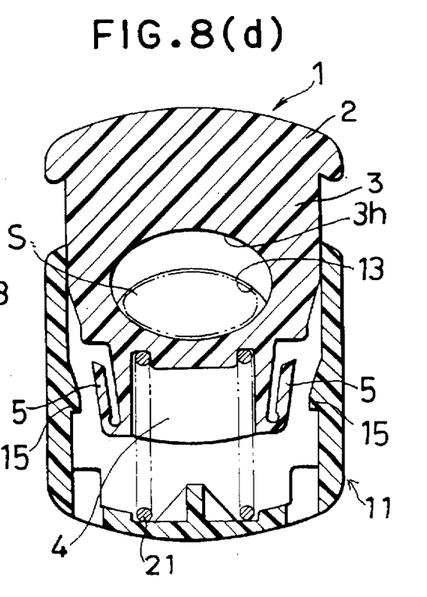
FIG. 8(d) is a sectional view of the cord fastener of FIG. 7 showing a cord clamped by the insert and the shell.

When the insert 1 in the first state shown in FIG. 8(b) is pressed further into the insertion hole 12 against the force of the coil spring 21 until the head portion 2 strikes the shell 11 as shown in FIG. 8(c) (the second state), the provisional retaining claws 5, 5 are pushed inwardly to a considerable extent and deformed by pressure from the pushers 16, 16. Since the provisional retaining claws 5, 5 are made of plastically deformable resin, they deform inwardly and do not restore to their original state when the pressure exerted thereon exceeds the elastic limit of the resin. The provisional retaining claws 5, 5 thus stay in the state with their tips pointing upwardly. When the inward pressure on the insert 1 is released and the insert 1 is pushed upwardly by the biasing force of the coil spring 21, the insert 1 rises without the claws 5, 5 engaging the provisional retainers 15, 15. As a result, a cord S can be clamped by the insert 1 and the shell 11 as shown in FIG. 8(d).

The third embodiment of the cord fastener therefore provides the same effects as the first.

Since the insert 1 of the third embodiment does not require catches for securing the provisional retaining claws, it is of simple shape and can be formed by a mold of simple configuration using a small amount of resin. The insert 1 of this embodiment can therefore be produced at low cost.

As the cord fastener according to this invention consists of only three components, the insert, shell and energizing member, it can be inexpensively manufactured.

Moreover, since the inner cord hole and the outer cord holes are in approximate alignment in the first state when the provisional retaining claws are engaged with the provisional retainers, the insert need not be continuously pressed inwardly against the force of the coil spring while the cord S is being passed through the cord holes. The work of inserting cords into cord fasteners can therefore be conducted with good efficiency even over long work periods.

In addition, the cord fastener can be conferred with the same functions as a conventional cord fastener after passage of the cord through the cord holes simply by pressing the insert further into the shell.

Another advantage of the cord fastener according to the invention is that the portions of the outer cord holes where the cord is not present are covered by the cylindrical portion of the insert, thereby preventing invasion of foreign matter into the shell through the outer cord holes during use and thus precluding operational problems.

Obviously, many modifications and variations of the present invention are possible in light of the above teachings. It is therefore to be understood that within the scope of the appended claims, the present invention may be practiced otherwise than as specifically described herein.

What is claimed is:

1. A cord fastener, comprising:

an insert having a longitudinal axis, a transversely extending inner cord hole, and provided at a lower portion thereof with at least one elastic radially movable retaining claw and at least one catch for securing said at least one retaining claw at a radially inner position;

a shell having an axially extending insertion hole defined therein for receiving said insert, outer cord holes communicating with said insertion hole and alignable with said inner cord hole of said insert, at least one retainer provided upon an inner surface of said shell, defining said insertion hole thereof, at a position below said outer cord holes for engaging a tip of said at least one retaining claw of said insert when said insert is axially inserted into said shell to a first axial position wherein said inner and outer cord holes of said insert and shell are substantially aligned with each other so as to retain said insert at said first axial position within said shell at which said inner and outer cord holes of said insert and shell are substantially aligned with each other and thereby facilitate the passage of a cord through said inner and outer holes of said insert and shell, and at least one pusher provided upon said inner surface of said shell, defining said insertion hole thereof, at a position below said at least one retainer for pushing said at least one retaining claw of said insert radially inwardly when said insert is inserted axially further into said insertion hole of said shell to a second axial position, thereby causing said at least one retaining claw of said insert to engage said at least one catch of said insert so as to prevent said at least one retaining claw from engaging said at least one retainer and thereby permit said insert to move in an axial direction opposite to said insertion of said insert into said shell to a third axial position at which said inner and outer cord holes of said insert and shell are not aligned with each other when it is desired to clampingly engage a cord, passed through said aligned inner and outer cord holes of said insert and said shell when said insert was disposed at said first axial position with respect to said shell, within said cord fastener; and biasing means disposed within said insertion hole of said shell for biasing said insert in said direction opposite to said insertion of said insert into said shell and to said third axial position so as to cause misalignment of said inner and outer holes of said insert and said shell whereby a cord passed through said inner and outer holes of said insert and said shell is clampingly engaged within said cord fastener.

2. A cord fastener according to claim 1, wherein the lower portion of the insert is formed with a cylindrical portion which receives one end of the biasing means and hides the interior of the shell from view through the outer cord holes.

3. The cord fastener as set forth in claim 1, wherein:

said at least one retaining claw comprises a pair of retaining claws disposed upon diametrically opposite sides of said insert;

said at least one catch comprises a pair of catches disposed upon diametrically opposite sides of said insert;

said at least one retainer comprises a pair of retainers disposed upon diametrically opposite sides of said shell for respectively cooperating with said pair of retaining claws; and said at least one pusher comprises a pair of pushers disposed upon diametrically opposite sides of said shell for respectively cooperating with said pair of retaining claws.

4. The cord fastener as set forth in claim 1, wherein:

said biasing means comprises a coil spring.

5. The cord fastener as set forth in claim 4, wherein:

one end of said coil spring is engaged with said lower portion of said insert; and a second end of said coil spring is engaged with an end wall of said shell.

6. The cord fastener as set forth in claim 5, wherein:

said one end of said coil spring is disposed interiorly of a downwardly dependent axially extending cylindrical portion of said lower portion of said insert; and said at least one retaining claw and said at least one catch are disposed upon radially outer surface portions of said cylindrical portion of said lower portion of said insert.

7. The cord fastener as set forth in claim 1, wherein:

said at least one retaining claw extends axially upwardly and radially outwardly from said lower portion of said insert; and said at least one catch projects radially outwardly from said lower portion of said insert.

8. The cord fastener as set forth in claim 1, wherein:

said at least one retaining claw extends axially downwardly and radially inwardly from said lower portion of said insert; and said at least one catch projects axially downwardly from said lower portion of said insert.

9. A cord fastener, comprising:

an insert having a longitudinal axis, a transversely extending inner cord hole, and provided at a lower portion thereof with at least one plastically deformable radially movable retaining claw which has a predetermined amount of elasticity;

a shell having an axially extending insertion hole defined therein for receiving said insert, outer cord holes communicating with said insertion hole and alignable with said inner cord hole of said insert, at least one retainer provided upon an inner surface of said shell, defining said insertion hole thereof, at a position below said outer cord holes of said shell for engaging a tip of said at least one plastically deformable radially movable retaining claw of said insert when said insert is axially inserted into said shell to a first axial position wherein said inner and outer cord holes of said insert and said shell are substantially aligned with each other so as to retain said insert at said first axial position within said shell at which said inner and outer cord holes of said insert and said shell are substantially aligned with each other and thereby facilitate the passage of a cord through said inner and outer cord holes of said insert and said shell, and at least one pusher provided upon said inner surface of said shell, defining said insertion hole thereof, at a position below said at least one retainer for pushing said at least one plastically deformable radially movable retaining claw of said insert radially inwardly to a plastically deformed position when said insert is moved axially further into said insertion hole of said shell to a second axial position, thereby preventing said at least one plastically deformable radially movable retaining claw from engaging said at least one retainer so as to permit said insert to move in an axial direction opposite to said insertion of said insert into said shell to a third axial position at which said inner and outer cord holes of said insert and said shell are not aligned with each other when it is desired to clampingly engage a cord, passed through said aligned inner and outer cord holes of said insert and said shell when said insert was disposed at said first axial position with respect to said shell, within said cord fastener; and biasing means disposed within said insertion hole of said shell for biasing said insert in said direction opposite to said insertion of said insert into said shell and to said third axial position so as to cause misalignment of said inner and outer cord holes of said insert and said shell whereby a cord passed through said inner and outer cord holes of said insert and said shell is clampingly engaged within said cord fastener.

10. A cord fastener according to claim 9, wherein the lower portion of the insert is formed with a cylindrical portion which receives one end of the biasing means and hides the interior of the shell from view through the outer cord holes.

11. The cord fastener as set forth in claim 9, wherein:

said at least one retaining claw comprises a pair of retaining claws disposed upon diametrically opposite sides of said insert;

said at least one retainer comprises a pair of retainers disposed upon diametrically opposite sides of said shell for respectively operatively engaging said pair of retaining claws such that said insert is retained at said first axial position; and said at least one pusher comprises a pair of pushers disposed upon diametrically opposite sides of said shell for respectively operatively engaging said pair of retaining claws and pushing said pair of retaining claws radially inwardly to their plastically deformed states.

12. The cord fastener as set forth in claim 9, wherein:

said biasing means comprises a coil spring.

13. The cord fastener as set forth in claim 12, wherein:

a first end of said coil spring is engaged with said lower portion of said insert; and a second end of said coil spring is engaged with an end wall of said shell.

14. The cord fastener as set forth in claim 13, wherein:

said lower portion of said insert comprises a downwardly dependent axially extending cylindrical portion;

said first end of said coil spring is disposed radially inwardly of said cylindrical portion; and said at least one retaining claw is disposed upon a radially outer surface portion of said cylindrical portion.

15. A cord fastener, comprising:

an insert having a longitudinal axis, a transversely extending inner cord hole, and provided at a lower portion thereof with at least one radially movable retaining claw;

a shell having an axially extending insertion hole defined therein for receiving said insert, outer cord holes communicating with said insertion hole and alignable with said inner cord hole of said insert, at least one retainer provided upon an inner surface of said shell, which defines said insertion hole thereof, at a position below said outer cord holes of said shell for engaging a tip of said at least one retaining claw of said insert, when said insert is axially inserted into said shell to a first axial position wherein said inner and outer cord holes of said insert and said shell are substantially aligned with each other, so as to retain said insert at said first axial position within said shell at which said inner and outer cord holes of said insert and said shell are substantially aligned with each other and thereby facilitate the passage of a cord through said inner and outer cord holes of said insert and said shell, and at least one pusher provided upon said inner surface of said shell, which defines said insertion hole thereof, at a position below said at least one retainer for pushing said at least one retaining claw of said insert radially inwardly when said insert is moved axially further into said insertion hole of said shell from said first axial position to a second axial position, thereby causing said at least one retaining claw of said insert to be disposed clear of said at least one retainer so as not to engage said at least one retainer and thereby permit said insert to move in an axial direction opposite to said insertion of said insert into said shell to a third axial position at which said inner and outer cord holes of said insert and said shell are not aligned with each other when it is desired to clampingly engage a cord, passed through said aligned inner and outer cord holes of said insert and said shell when said insert was disposed at said first axial position with respect to said shell, within said cord fastener; and biasing means disposed within said insertion hole of said shell for biasing said insert in said direction opposite to said insertion of said insert into said shell and to said third axial position so as to cause misalignment of said inner and outer cord holes of said insert and said shell whereby a cord passed through said inner and outer cord holes of said insert and said shell is clampingly engaged within said cord fastener.

16. The cord fastener as set forth in claim 15, wherein:

said at least one retaining claw comprises a pair of retaining claws disposed upon diametrically opposite sides of said insert;

said at least one retainer comprises a pair of retainers disposed upon diametrically opposite sides of said shell for respectively operatively engaging said pair of retaining claws such that said insert is retained at said first axial position; and said at least one pusher comprises a pair of pushers disposed upon diametrically opposite sides of said shell for respectively operatively engaging said pair of retaining claws and pushing said pair of retaining claws radially inwardly.

17. The cord fastener as set forth in claim 15, wherein:

said biasing means comprises a coil spring.

18. The cord fastener as set forth in claim 17, wherein:

a first end of said coil spring is engaged with said lower portion of said insert; and a second end of said coil spring is engaged with an end wall of said shell.

19. The cord fastener as set forth in claim 18, wherein:

said lower portion of said insert comprises a downwardly dependent axially extending cylindrical portion;

said first end of said coil spring is disposed radially inwardly of said cylindrical portion; and said at least one retaining claw is disposed upon a radially outer surface portion of said cylindrical portion.

20. The cord fastener as set forth in claim 15, wherein:

said at least one retaining claw extends axially upwardly and radially outwardly from said lower portion of said insert.

* * * * *